United States Patent
Wu et al.

(10) Patent No.: US 10,350,817 B2
(45) Date of Patent: *Jul. 16, 2019

(54) METHOD TO CREATE VACUUM INSULATED CABINETS FOR REFRIGERATORS

(71) Applicant: WHIRLPOOL CORPORATION, Benton Harbor, MI (US)

(72) Inventors: Guolian Wu, St. Joseph, MI (US); Nihat Cur, St. Joseph, MI (US); Jurgen Pannock, St. Joseph, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/814,500

(22) Filed: Nov. 16, 2017

(65) Prior Publication Data

US 2018/0071972 A1  Mar. 15, 2018

Related U.S. Application Data (63) Continuation of application No. 15/285,895, filed on Oct. 5, 2016, now Pat. No. 9,833,942, which is a
(Continued)

(51) Int. Cl.
*B29C 51/08* (2006.01)
*B29C 51/02* (2006.01)
(Continued)

(52) U.S. Cl.
CPC .............. *B29C 51/02* (2013.01); *B29C 51/06* (2013.01); *B29C 51/082* (2013.01);
(Continued)

(58) Field of Classification Search
CPC ..... B29C 51/00; B29C 51/002; B29C 51/006; B29C 51/02; B29C 51/08; B29C 51/082; B29C 51/085; B29C 51/087
See application file for complete search history.

(56) References Cited

U.S. PATENT DOCUMENTS

| 948,541 A | 2/1910 | Coleman |
| 1,275,511 A | 8/1918 | Welch |

(Continued)

FOREIGN PATENT DOCUMENTS

| CA | 626838 A | 5/1961 |
| CA | 1320631 | 7/1993 |

(Continued)

OTHER PUBLICATIONS

Kitchen Aid, "Refrigerator User Instructions," 120 pages, published Sep. 5, 2015.

(Continued)

*Primary Examiner* — Ryan M Ochylski
(74) *Attorney, Agent, or Firm* — Price Heneveld LLP (57) ABSTRACT

A method of forming a vacuum insulated refrigerator cabinet, the method comprising providing first and second sheets of material. The first sheet of material is thermoformed over a first forming tool forming a first intermediate structure. The first intermediate structure is then thermoformed over a second forming mold to create a second intermediate structure. The second sheet of material is then sealing connected with the second intermediate structure forming an annular space. A vacuum is created in the annular space creating a vacuum insulated cabinet.

20 Claims, 3 Drawing Sheets

Related U.S. Application Data continuation of application No. 14/962,587, filed on Dec. 8, 2015, now Pat. No. 9,463,917, which is a continuation of application No. 13/833,685, filed on Mar. 15, 2013, now Pat. No. 9,221,210.

(60) Provisional application No. 61/622,821, filed on Apr. 11, 2012.

(51) Int. Cl.
*B29C 51/06* (2006.01)
*F25D 23/06* (2006.01)
*B65D 81/38* (2006.01)
*B29L 31/00* (2006.01)
*B29K 101/12* (2006.01)
*B29K 105/04* (2006.01)

(52) U.S. Cl.
CPC ....... *B65D 81/3806* (2013.01); *F25D 23/064* (2013.01); *F25D 23/065* (2013.01); *B29C 2791/001* (2013.01); *B29K 2101/12* (2013.01); *B29K 2105/04* (2013.01); *B29K 2995/0067* (2013.01); *B29L 2031/7622* (2013.01); *F25D 2201/1262* (2013.01); *F25D 2201/14* (2013.01)

(56) References Cited

U.S. PATENT DOCUMENTS

| | | |
|---|---|---|
| 1,849,369 A | 3/1932 | Frost |
| 1,921,576 A | 8/1933 | Muffly |
| 2,108,212 A | 2/1938 | Schellens |
| 2,128,336 A | 8/1938 | Torstensson |
| 2,164,143 A | 6/1939 | Munters |
| 2,191,659 A | 2/1940 | Hintze |
| 2,318,744 A | 5/1943 | Brown |
| 2,356,827 A | 8/1944 | Coss et al. |
| 2,644,526 A | 10/1945 | Palmer |
| 2,432,042 A | 12/1947 | Richard |
| 2,439,602 A | 4/1948 | Heritage |
| 2,439,603 A | 4/1948 | Heritage |
| 2,451,884 A | 10/1948 | Stelzer |
| 2,538,780 A | 1/1951 | Hazard |
| 2,559,356 A | 7/1951 | Hedges |
| 2,644,605 A | 7/1953 | Palmer |
| 2,729,863 A | 1/1956 | Kurtz |
| 2,768,046 A | 10/1956 | Evans |
| 2,792,959 A | 5/1957 | Diamond et al. |
| 2,809,764 A | 10/1957 | Diamond |
| 2,817,123 A | 12/1957 | Jacobs |
| 2,942,438 A | 6/1960 | Schmeling |
| 2,985,075 A | 5/1961 | Knutsson-Hall |
| 3,086,830 A | 4/1963 | Malia |
| 3,125,388 A | 3/1964 | Constantini et al. |
| 3,137,900 A | 6/1964 | Carbary |
| 3,165,221 A | 1/1965 | Kasady |
| 3,218,111 A | 11/1965 | Steiner |
| 3,258,883 A | 7/1966 | Companaro et al. |
| 3,290,893 A | 12/1966 | Haldopoulos |
| 3,338,451 A | 8/1967 | Kesling |
| 3,353,301 A | 11/1967 | Heilweil et al. |
| 3,353,321 A | 11/1967 | Heilweil et al. |
| 3,358,059 A | 12/1967 | Snyder |
| 3,379,481 A | 4/1968 | Fisher |
| 3,408,316 A | 10/1968 | Mueller et al. |
| 3,471,416 A | 10/1969 | Fijal |
| 3,597,850 A | 8/1971 | Jenkins |
| 3,607,169 A | 9/1971 | Coxe |
| 3,632,012 A | 1/1972 | Kitson |
| 3,633,783 A | 1/1972 | Aue |
| 3,634,971 A | 1/1972 | Kesling |
| 3,635,536 A | 1/1972 | Lackey et al. |
| 3,670,521 A | 6/1972 | Dodge, III et al. |
| 3,688,384 A | 9/1972 | Mizushima et al. |
| 3,768,687 A | 10/1973 | Spencer |
| 3,769,770 A | 11/1973 | Deschamps et al. |
| 3,862,880 A | 1/1975 | Feldman |
| 3,868,829 A | 3/1975 | Mann et al. |
| 3,875,683 A | 4/1975 | Waters |
| 3,910,658 A | 10/1975 | Lindenschmidt |
| 3,915,328 A | 10/1975 | Hawes et al. |
| 3,933,398 A | 1/1976 | Haag |
| 3,935,787 A | 2/1976 | Fisher |
| 4,005,919 A | 2/1977 | Hoge et al. |
| 4,006,947 A | 2/1977 | Haag et al. |
| 4,043,624 A | 8/1977 | Lindenschmidt |
| 4,050,145 A | 9/1977 | Benford |
| 4,067,628 A | 1/1978 | Sherbum |
| 4,118,266 A | 10/1978 | Kerr |
| 4,170,391 A | 10/1979 | Bottger |
| 4,180,297 A | 12/1979 | Abrams |
| 4,242,241 A | 12/1980 | Rosen et al. |
| 4,260,876 A | 4/1981 | Hochheiser |
| 4,303,730 A | 12/1981 | Torobin |
| 4,303,732 A | 12/1981 | Torobin |
| 4,325,734 A | 4/1982 | Burrage et al. |
| 4,330,310 A | 5/1982 | Tate, Jr. et al. |
| 4,332,429 A | 6/1982 | Frick et al. |
| 4,396,362 A | 8/1983 | Thompson et al. |
| 4,417,382 A | 11/1983 | Schilf |
| 4,492,368 A | 1/1985 | DeLeeuw et al. |
| 4,529,368 A | 7/1985 | Makansi |
| 4,548,196 A | 10/1985 | Torobin |
| 4,583,796 A | 4/1986 | Nakajima et al. |
| 4,660,271 A | 4/1987 | Lenhardt |
| 4,671,909 A | 6/1987 | Torobin |
| 4,671,985 A | 6/1987 | Rodrigues et al. |
| 4,681,788 A | 7/1987 | Barito et al. |
| 4,732,432 A | 3/1988 | Keil et al. |
| 4,745,015 A | 5/1988 | Cheng et al. |
| 4,777,154 A | 10/1988 | Torobin |
| 4,781,968 A | 11/1988 | Kellerman |
| 4,805,293 A | 2/1989 | Buchser |
| 4,865,875 A | 9/1989 | Kellerman |
| 4,870,735 A | 10/1989 | Jahr et al. |
| 4,914,341 A | 4/1990 | Weaver et al. |
| 4,917,841 A | 4/1990 | Jenkins |
| 4,951,652 A | 8/1990 | Ferrario et al. |
| 5,007,226 A | 4/1991 | Nelson |
| 5,018,328 A | 5/1991 | Cur et al. |
| 5,033,636 A | 7/1991 | Jenkins |
| 5,066,437 A | 11/1991 | Barito et al. |
| 5,076,984 A | 12/1991 | Bisplinghoff et al. |
| 5,082,335 A | 1/1992 | Cur et al. |
| 5,084,320 A | 1/1992 | Barito et al. |
| 5,094,899 A | 3/1992 | Rusek, Jr. |
| 5,118,174 A | 6/1992 | Benford et al. |
| 5,121,593 A | 6/1992 | Forslund |
| 5,157,893 A | 10/1992 | Benson et al. |
| 5,168,674 A | 12/1992 | Molthen |
| 5,171,346 A | 12/1992 | Hallett |
| 5,175,975 A | 1/1993 | Benson et al. |
| 5,212,143 A | 5/1993 | Torobin |
| 5,221,136 A | 6/1993 | Hauck et al. |
| 5,227,245 A | 7/1993 | Brands et al. |
| 5,231,811 A | 8/1993 | Andrepont et al. |
| 5,248,196 A | 9/1993 | Lynn et al. |
| 5,251,455 A | 10/1993 | Cur et al. |
| 5,252,408 A | 10/1993 | Bridges et al. |
| 5,263,773 A | 11/1993 | Gable et al. |
| 5,269,099 A | 12/1993 | Kennedy et al. |
| 5,273,801 A | 12/1993 | Barry et al. |
| 5,284,023 A | 2/1994 | Silva et al. |
| 5,318,108 A | 6/1994 | Benson et al. |
| 5,340,208 A | 8/1994 | Hauck et al. |
| 5,353,868 A | 10/1994 | Abbott |
| 5,359,795 A | 11/1994 | Mawby et al. |
| 5,368,381 A | 11/1994 | Mandel |
| 5,375,428 A | 12/1994 | LeClear et al. |
| 5,397,759 A | 3/1995 | Torobin |
| 5,418,055 A | 5/1995 | Chen et al. |
| 5,433,056 A | 7/1995 | Benson et al. |
| 5,477,676 A | 12/1995 | Benson et al. |
| 5,500,287 A | 3/1996 | Henderson |

(56) References Cited

U.S. PATENT DOCUMENTS

| | | |
|---|---|---|
| 5,500,305 A | 3/1996 | Bridges et al. |
| 5,505,810 A | 4/1996 | Kirby et al. |
| 5,507,999 A | 4/1996 | Copsey et al. |
| 5,509,248 A | 4/1996 | Dellby et al. |
| 5,512,345 A | 4/1996 | Tsutsumi et al. |
| 5,532,034 A | 7/1996 | Kirby et al. |
| 5,533,311 A | 7/1996 | Tirrell et al. |
| 5,562,154 A | 10/1996 | Benson et al. |
| 5,586,680 A | 12/1996 | Dellby et al. |
| 5,599,081 A | 2/1997 | Revlett et al. |
| 5,600,966 A | 2/1997 | Valence et al. |
| 5,632,543 A | 5/1997 | McGrath et al. |
| 5,640,828 A | 6/1997 | Reeves et al. |
| 5,643,485 A | 7/1997 | Potter et al. |
| 5,652,039 A | 7/1997 | Tremain et al. |
| 5,704,107 A | 1/1998 | Schmidt et al. |
| 5,716,581 A | 2/1998 | Tirrell et al. |
| 5,768,837 A | 6/1998 | Sjoholm |
| 5,792,539 A | 8/1998 | Hunter |
| 5,792,801 A | 8/1998 | Tsuda et al. |
| 5,813,454 A | 9/1998 | Potter |
| 5,826,780 A | 10/1998 | Nesser et al. |
| 5,827,385 A | 10/1998 | Meyer et al. |
| 5,834,126 A | 11/1998 | Sheu |
| 5,843,353 A | 12/1998 | DeVos et al. |
| 5,866,228 A | 2/1999 | Awata |
| 5,866,247 A | 2/1999 | Klatt et al. |
| 5,868,890 A | 2/1999 | Fredrick |
| 5,876,104 A | 3/1999 | Kunkel et al. |
| 5,900,299 A | 5/1999 | Wynne |
| 5,918,478 A | 7/1999 | Bostic et al. |
| 5,924,295 A | 7/1999 | Park |
| 5,934,085 A | 8/1999 | Suzuki et al. |
| 5,950,395 A | 9/1999 | Takemasa et al. |
| 5,952,404 A | 9/1999 | Simpson et al. |
| 5,966,963 A | 10/1999 | Kovalaske |
| 5,985,189 A | 11/1999 | Lynn et al. |
| 6,013,700 A | 1/2000 | Asano et al. |
| 6,029,846 A | 2/2000 | Hirath et al. |
| 6,037,033 A | 3/2000 | Hunter |
| 6,063,471 A | 5/2000 | Dietrich et al. |
| 6,094,922 A | 8/2000 | Ziegler |
| 6,109,712 A | 8/2000 | Haworth et al. |
| 6,128,914 A | 10/2000 | Tamaoki et al. |
| 6,132,837 A | 10/2000 | Boes et al. |
| 6,158,233 A | 12/2000 | Cohen et al. |
| 6,163,976 A | 12/2000 | Tada et al. |
| 6,164,030 A | 12/2000 | Dietrich |
| 6,164,739 A | 12/2000 | Schulz et al. |
| 6,187,256 B1 | 2/2001 | Aslan et al. |
| 6,209,342 B1 | 4/2001 | Banicevic et al. |
| 6,210,625 B1 | 4/2001 | Matsushita et al. |
| 6,217,140 B1 | 4/2001 | Hirath et al. |
| 6,220,473 B1 | 4/2001 | Lehman et al. |
| 6,221,456 B1 | 4/2001 | Pogorski et al. |
| 6,224,179 B1 | 5/2001 | Wenning et al. |
| 6,244,458 B1 | 6/2001 | Frysinger et al. |
| 6,260,377 B1 | 7/2001 | Tamaoki et al. |
| 6,266,941 B1 | 7/2001 | Nishimoto |
| 6,266,970 B1 | 7/2001 | Nam et al. |
| 6,294,595 B1 | 9/2001 | Tyagi et al. |
| 6,305,768 B1 | 10/2001 | Nishimoto |
| 6,336,693 B2 | 1/2002 | Nishimoto |
| 6,485,122 B2 | 1/2002 | Wolf et al. |
| 6,390,378 B1 | 5/2002 | Briscoe, Jr. et al. |
| 6,406,449 B1 | 6/2002 | Moore et al. |
| 6,408,841 B1 | 6/2002 | Hirath et al. |
| 6,415,623 B1 | 7/2002 | Jennings et al. |
| 6,428,130 B1 | 8/2002 | Banicevic et al. |
| 6,430,780 B1 | 8/2002 | Kim et al. |
| 6,460,955 B1 | 10/2002 | Vaughan et al. |
| 6,519,919 B1 | 2/2003 | Takenouchi et al. |
| 6,623,413 B1 | 9/2003 | Wynne |
| 6,629,429 B1 | 10/2003 | Kawamura et al. |
| 6,651,444 B2 | 11/2003 | Morimoto et al. |
| 6,655,766 B2 | 12/2003 | Hodges |
| 6,689,840 B1 | 2/2004 | Eustace et al. |
| 6,716,501 B2 | 4/2004 | Kovalchuk et al. |
| 6,736,472 B2 | 5/2004 | Banicevic |
| 6,749,780 B2 | 6/2004 | Tobias |
| 6,773,082 B2 | 8/2004 | Lee |
| 6,858,280 B2 | 2/2005 | Allen et al. |
| 6,860,082 B1 | 3/2005 | Yamamoto et al. |
| 6,938,968 B2 | 9/2005 | Tanimoto et al. |
| 6,997,530 B2 | 2/2006 | Avendano et al. |
| 7,008,032 B2 | 3/2006 | Chekal et al. |
| 7,026,054 B2 | 4/2006 | Ikegawa et al. |
| 7,197,792 B2 | 4/2007 | Moon |
| 7,197,888 B2 | 4/2007 | LeClear et al. |
| 7,207,181 B2 | 4/2007 | Murray et al. |
| 7,210,308 B2 | 5/2007 | Tanimoto et al. |
| 7,234,247 B2 | 6/2007 | Maguire |
| 7,263,744 B2 | 9/2007 | Kim et al. |
| 7,278,279 B2 | 10/2007 | Hirai et al. |
| 7,284,390 B2 | 10/2007 | Van Meter et al. |
| 7,296,432 B2 | 11/2007 | Muller et al. |
| 7,316,125 B2 | 1/2008 | Uekado et al. |
| 7,343,757 B2 | 3/2008 | Egan et al. |
| 7,360,371 B2 | 4/2008 | Feinauer et al. |
| 7,386,992 B2 | 6/2008 | Adamski et al. |
| 7,449,227 B2 | 11/2008 | Echigoya et al. |
| 7,475,562 B2 | 1/2009 | Jackovin |
| 7,517,031 B2 | 4/2009 | Laible |
| 7,517,576 B2 | 4/2009 | Echigoya et al. |
| 7,537,817 B2 | 5/2009 | Tsunetsugu et al. |
| 7,614,244 B2 | 11/2009 | Venkatakrishnan et al. |
| 7,625,622 B2 | 12/2009 | Teckoe et al. |
| 7,641,298 B2 | 1/2010 | Hirath et al. |
| 7,665,326 B2 | 2/2010 | LeClear et al. |
| 7,703,217 B2 | 4/2010 | Tada et al. |
| 7,703,824 B2 | 4/2010 | Kittelson et al. |
| 7,757,511 B2 | 7/2010 | LeClear et al. |
| 7,762,634 B2 | 7/2010 | Tenra et al. |
| 7,794,805 B2 | 9/2010 | Aumaugher et al. |
| 7,815,269 B2 | 10/2010 | Wenning et al. |
| 7,842,269 B2 | 11/2010 | Schachtely et al. |
| 7,845,745 B2 | 12/2010 | Gorz et al. |
| 7,861,538 B2 | 1/2011 | Welle et al. |
| 7,886,559 B2 | 2/2011 | Hell et al. |
| 7,893,123 B2 | 2/2011 | Luisi |
| 7,905,614 B2 | 3/2011 | Aoki |
| 7,908,873 B1 | 3/2011 | Cur et al. |
| 7,930,892 B1 | 4/2011 | Vonderhaar |
| 7,938,148 B2 | 5/2011 | Carlier et al. |
| 7,939,179 B2 | 5/2011 | DeVos et al. |
| 7,992,257 B2 | 8/2011 | Kim |
| 8,049,518 B2 | 11/2011 | Wern et al. |
| 8,074,469 B2 | 12/2011 | Hamel et al. |
| 8,079,652 B2 | 12/2011 | Laible et al. |
| 8,083,985 B2 | 12/2011 | Luisi et al. |
| 8,108,972 B2 | 2/2012 | Bae et al. |
| 8,113,604 B2 | 2/2012 | Olson et al. |
| 8,117,865 B2 | 2/2012 | Allard et al. |
| 8,157,338 B2 | 4/2012 | Seo et al. |
| 8,162,415 B2 | 4/2012 | Hagele et al. |
| 8,163,080 B2 | 4/2012 | Meyer et al. |
| 8,176,746 B2 | 5/2012 | Allard et al. |
| 8,182,051 B2 | 5/2012 | Laible et al. |
| 8,197,019 B2 | 6/2012 | Kim |
| 8,202,599 B2 | 6/2012 | Henn |
| 8,211,523 B2 | 7/2012 | Fujimori et al. |
| 8,266,923 B2 | 9/2012 | Bauer et al. |
| 8,281,558 B2 | 10/2012 | Hiemeyer et al. |
| 8,299,545 B2 | 10/2012 | Chen et al. |
| 8,299,656 B2 | 10/2012 | Allard et al. |
| 8,343,395 B2 | 1/2013 | Hu et al. |
| 8,353,177 B2 | 1/2013 | Adamski et al. |
| 8,382,219 B2 | 2/2013 | Hottmann et al. |
| 8,434,317 B2 | 5/2013 | Besore |
| 8,439,460 B2 | 5/2013 | Laible et al. |
| 8,453,476 B2 | 6/2013 | Kendall et al. |
| 8,456,040 B2 | 6/2013 | Allard et al. |
| 8,486,215 B2 | 7/2013 | Amann |
| 8,491,070 B2 | 7/2013 | Davis et al. |

(56) References Cited

U.S. PATENT DOCUMENTS

| | | |
|---|---|---|
| 8,516,845 B2 | 8/2013 | Wuesthoff et al. |
| 8,522,563 B2 | 9/2013 | Allard et al. |
| 8,528,284 B2 | 9/2013 | Aspenson et al. |
| 8,590,992 B2 | 11/2013 | Lim et al. |
| 8,717,029 B2 | 5/2014 | Chae et al. |
| 8,726,690 B2 | 5/2014 | Cur et al. |
| 8,733,123 B2 | 5/2014 | Adamski et al. |
| 8,739,567 B2 | 6/2014 | Junge |
| 8,739,568 B2 | 6/2014 | Allard et al. |
| 8,752,918 B2 | 6/2014 | Kang |
| 8,752,921 B2 | 6/2014 | Gorz et al. |
| 8,756,952 B2 | 6/2014 | Adamski et al. |
| 8,763,847 B2 | 7/2014 | Mortarotti |
| 8,764,133 B2 | 7/2014 | Park et al. |
| 8,770,682 B2 | 7/2014 | Lee et al. |
| 8,776,390 B2 | 7/2014 | Hanaoka et al. |
| 8,790,477 B2 | 7/2014 | Tenra et al. |
| 8,840,204 B2 | 9/2014 | Bauer et al. |
| 8,852,708 B2 | 10/2014 | Kim et al. |
| 8,871,323 B2 | 10/2014 | Kim et al. |
| 8,881,398 B2 | 11/2014 | Hanley et al. |
| 8,899,068 B2 | 12/2014 | Jung et al. |
| 8,905,503 B2 | 12/2014 | Sahasrabudhe et al. |
| 8,927,084 B2 | 1/2015 | Jeon et al. |
| 8,943,770 B2 | 2/2015 | Sanders et al. |
| 8,944,541 B2 | 2/2015 | Allard et al. |
| 8,986,483 B2 | 3/2015 | Cur et al. |
| 9,009,969 B2 | 4/2015 | Choi et al. |
| RE45,501 E | 5/2015 | Maguire |
| 9,056,952 B2 | 6/2015 | Eilbracht et al. |
| 9,062,480 B2 | 6/2015 | Litch |
| 9,074,811 B2 | 7/2015 | Korkmaz |
| 9,080,808 B2 | 7/2015 | Choi et al. |
| 9,102,076 B2 | 8/2015 | Doshi et al. |
| 9,103,482 B2 | 8/2015 | Fujimori et al. |
| 9,125,546 B2 | 9/2015 | Kleemann et al. |
| 9,140,480 B2 | 9/2015 | Kuehl et al. |
| 9,140,481 B2 | 9/2015 | Cur et al. |
| 9,170,045 B2 | 10/2015 | Oh et al. |
| 9,170,046 B2 | 10/2015 | Jung et al. |
| 9,188,382 B2 | 11/2015 | Kim et al. |
| 8,955,352 B2 | 12/2015 | Lee et al. |
| 9,221,210 B2 * | 12/2015 | Wu .................. B29C 51/02 |
| 9,228,386 B2 | 1/2016 | Thielmann et al. |
| 9,252,570 B2 | 2/2016 | Allard et al. |
| 9,267,727 B2 | 2/2016 | Lim et al. |
| 9,303,915 B2 | 4/2016 | Kim et al. |
| 9,328,951 B2 | 5/2016 | Shin et al. |
| 9,353,984 B2 | 5/2016 | Kim et al. |
| 9,410,732 B2 | 8/2016 | Choi et al. |
| 9,423,171 B2 | 8/2016 | Betto et al. |
| 9,429,356 B2 | 8/2016 | Kim et al. |
| 9,448,004 B2 | 9/2016 | Kim et al. |
| 9,463,917 B2 * | 10/2016 | Wu .................. B29C 51/02 |
| 9,482,463 B2 | 11/2016 | Choi et al. |
| 9,506,689 B2 | 11/2016 | Carbajal et al. |
| 9,518,777 B2 | 12/2016 | Lee et al. |
| 9,568,238 B2 | 2/2017 | Kim et al. |
| D781,641 S | 3/2017 | Incukur |
| D781,642 S | 3/2017 | Incukur |
| 9,605,891 B2 | 3/2017 | Lee et al. |
| 9,696,085 B2 | 7/2017 | Seo et al. |
| 9,702,621 B2 | 7/2017 | Cho et al. |
| 9,759,479 B2 | 9/2017 | Ramm et al. |
| 9,777,958 B2 | 10/2017 | Choi et al. |
| 9,791,204 B2 | 10/2017 | Kim et al. |
| 9,833,942 B2 * | 12/2017 | Wu .................. B29C 51/02 |
| 9,927,169 B2 | 3/2018 | Baker et al. |
| 10,024,544 B2 | 7/2018 | Bhogal et al. |
| 10,077,342 B2 | 9/2018 | An et al. |
| 2002/0004111 A1 | 1/2002 | Matsubara et al. |
| 2002/0114937 A1 | 8/2002 | Albert et al. |
| 2002/0144482 A1 | 10/2002 | Henson et al. |
| 2002/0168496 A1 | 11/2002 | Morimoto et al. |
| 2003/0008100 A1 | 1/2003 | Horn |
| 2003/0041612 A1 | 3/2003 | Piloni et al. |
| 2003/0056334 A1 | 3/2003 | Finkelstein |
| 2003/0157284 A1 | 8/2003 | Tanimoto et al. |
| 2003/0167789 A1 | 9/2003 | Tanimoto et al. |
| 2003/0173883 A1 | 9/2003 | Koons |
| 2004/0144130 A1 | 7/2004 | Jung |
| 2004/0178707 A1 | 9/2004 | Avendano |
| 2004/0180176 A1 | 9/2004 | Rusek |
| 2004/0226141 A1 | 11/2004 | Yates et al. |
| 2004/0253406 A1 | 12/2004 | Hayashi et al. |
| 2005/0042247 A1 | 2/2005 | Gomoll et al. |
| 2005/0229614 A1 | 10/2005 | Ansted |
| 2005/0235682 A1 | 10/2005 | Hirai et al. |
| 2006/0064846 A1 | 3/2006 | Espindola et al. |
| 2006/0076863 A1 | 4/2006 | Echigoya et al. |
| 2006/0201189 A1 | 9/2006 | Adamski et al. |
| 2006/0261718 A1 | 11/2006 | Miseki et al. |
| 2006/0263571 A1 | 11/2006 | Tsunetsugu et al. |
| 2006/0266075 A1 | 11/2006 | Itsuki et al. |
| 2007/0001563 A1 | 1/2007 | Park et al. |
| 2007/0099502 A1 | 5/2007 | Ferinauer |
| 2007/0176526 A1 | 8/2007 | Gomoll et al. |
| 2007/0266654 A1 | 11/2007 | Noale |
| 2008/0044488 A1 | 2/2008 | Zimmer et al. |
| 2008/0048540 A1 | 2/2008 | Kim |
| 2008/0138458 A1 | 6/2008 | Ozasa et al. |
| 2008/0196441 A1 | 8/2008 | Ferreira |
| 2008/0300356 A1 | 12/2008 | Meyer et al. |
| 2008/0309210 A1 | 12/2008 | Luisi et al. |
| 2009/0032541 A1 | 2/2009 | Rogala et al. |
| 2009/0056367 A1 | 3/2009 | Neumann |
| 2009/0058244 A1 | 3/2009 | Cho et al. |
| 2009/0113925 A1 | 5/2009 | Korkmaz |
| 2009/0131571 A1 | 5/2009 | Fraser et al. |
| 2009/0179541 A1 | 7/2009 | Smith et al. |
| 2009/0205357 A1 | 8/2009 | Lim et al. |
| 2009/0302728 A1 | 12/2009 | Rotter et al. |
| 2009/0322470 A1 | 12/2009 | Yoo et al. |
| 2009/0324871 A1 | 12/2009 | Henn |
| 2010/0206464 A1 | 8/2010 | Heo et al. |
| 2010/0218543 A1 | 9/2010 | Duchame |
| 2010/0231109 A1 | 9/2010 | Matzke et al. |
| 2010/0287843 A1 | 11/2010 | Oh |
| 2010/0287974 A1 | 11/2010 | Cur et al. |
| 2010/0293984 A1 | 11/2010 | Adamski et al. |
| 2010/0295435 A1 | 11/2010 | Kendall et al. |
| 2011/0011119 A1 | 1/2011 | Kuehl et al. |
| 2011/0023527 A1 | 2/2011 | Kwon et al. |
| 2011/0030894 A1 | 2/2011 | Tenra et al. |
| 2011/0095669 A1 | 4/2011 | Moon et al. |
| 2011/0146325 A1 | 6/2011 | Lee |
| 2011/0146335 A1 | 6/2011 | Jung et al. |
| 2011/0165367 A1 | 7/2011 | Kojima et al. |
| 2011/0215694 A1 | 9/2011 | Fink et al. |
| 2011/0220662 A1 | 9/2011 | Kim et al. |
| 2011/0241513 A1 | 10/2011 | Nomura et al. |
| 2011/0241514 A1 | 10/2011 | Nomura et al. |
| 2011/0260351 A1 | 10/2011 | Corradi et al. |
| 2011/0290808 A1 | 12/2011 | Bai et al. |
| 2011/0309732 A1 | 12/2011 | Horil et al. |
| 2011/0315693 A1 | 12/2011 | Cur et al. |
| 2012/0000234 A1 | 1/2012 | Adamski et al. |
| 2012/0011879 A1 | 1/2012 | Gu |
| 2012/0060544 A1 | 3/2012 | Lee et al. |
| 2012/0099255 A1 | 4/2012 | Lee et al. |
| 2012/0103006 A1 | 5/2012 | Jung et al. |
| 2012/0104923 A1 | 5/2012 | Jung et al. |
| 2012/0118002 A1 | 5/2012 | Kim et al. |
| 2012/0137501 A1 | 6/2012 | Allard et al. |
| 2012/0152151 A1 | 6/2012 | Meyer et al. |
| 2012/0196059 A1 | 8/2012 | Fujimori et al. |
| 2012/0202049 A1 | 8/2012 | Valladeau et al. |
| 2012/0231204 A1 | 9/2012 | Jeon et al. |
| 2012/0237715 A1 | 9/2012 | McCracken |
| 2012/0240612 A1 | 9/2012 | Wusthoff et al. |
| 2012/0273111 A1 | 11/2012 | Nomura et al. |
| 2012/0279247 A1 | 11/2012 | Katu et al. |
| 2012/0280608 A1 | 11/2012 | Park et al. |
| 2012/0285971 A1 | 11/2012 | Junge et al. |

(56) References Cited

U.S. PATENT DOCUMENTS

| | | |
|---|---|---|
| 2012/0297813 A1 | 11/2012 | Hanley et al. |
| 2012/0324937 A1 | 12/2012 | Adamski et al. |
| 2013/0026900 A1 | 1/2013 | Oh et al. |
| 2013/0033163 A1 | 2/2013 | Kang |
| 2013/0043780 A1 | 2/2013 | Ootsuka et al. |
| 2013/0068990 A1 | 3/2013 | Eilbracht et al. |
| 2013/0111941 A1 | 5/2013 | Yu et al. |
| 2013/0221819 A1 | 8/2013 | Wing |
| 2013/0256318 A1 | 10/2013 | Kuehl et al. |
| 2013/0256319 A1 | 10/2013 | Kuehl et al. |
| 2013/0257256 A1 | 10/2013 | Allard et al. |
| 2013/0257257 A1 | 10/2013 | Cur et al. |
| 2013/0270732 A1 | 10/2013 | Wu et al. |
| 2013/0285527 A1 | 10/2013 | Choi et al. |
| 2013/0293080 A1 | 11/2013 | Kim et al. |
| 2013/0305535 A1 | 11/2013 | Cur et al. |
| 2013/0328472 A1 | 12/2013 | Shim et al. |
| 2014/0009055 A1 | 1/2014 | Cho et al. |
| 2014/0015395 A1 | 1/2014 | Anthony et al. |
| 2014/0047775 A1 | 2/2014 | Litch |
| 2014/0097733 A1 | 4/2014 | Seo et al. |
| 2014/0132144 A1 | 5/2014 | Kim et al. |
| 2014/0162162 A1 | 6/2014 | Kalika et al. |
| 2014/0166926 A1 | 6/2014 | Lee et al. |
| 2014/0171578 A1 | 6/2014 | Meyer et al. |
| 2014/0190978 A1 | 7/2014 | Bowman et al. |
| 2014/0196305 A1 | 7/2014 | Smith |
| 2014/0216706 A1 | 8/2014 | Melton et al. |
| 2014/0232250 A1 | 8/2014 | Kim et al. |
| 2014/0260332 A1 | 9/2014 | Wu |
| 2014/0311667 A1 | 10/2014 | Siudzinski et al. |
| 2014/0346942 A1 | 11/2014 | Kim et al. |
| 2014/0364527 A1 | 12/2014 | Matthias et al. |
| 2015/0011668 A1 | 1/2015 | Kolb et al. |
| 2015/0015133 A1 | 1/2015 | Carbajal et al. |
| 2015/0017386 A1 | 1/2015 | Kolb et al. |
| 2015/0027628 A1 | 1/2015 | Cravens et al. |
| 2015/0047624 A1 | 2/2015 | Luckhardt et al. |
| 2015/0059399 A1 | 3/2015 | Hwang et al. |
| 2015/0145790 A1 | 4/2015 | Ogg |
| 2015/0147514 A1 | 5/2015 | Shinohara et al. |
| 2015/0159936 A1 | 6/2015 | Oh et al. |
| 2015/0168050 A1 | 6/2015 | Cur et al. |
| 2015/0176888 A1 | 6/2015 | Cur et al. |
| 2015/0184923 A1 | 7/2015 | Jeon |
| 2015/0190840 A1 | 7/2015 | Muto et al. |
| 2015/0224685 A1 | 8/2015 | Amstutz |
| 2015/0241115 A1 | 8/2015 | Strauss et al. |
| 2015/0241118 A1 | 8/2015 | Wu |
| 2015/0285551 A1 | 10/2015 | Aiken et al. |
| 2016/0084567 A1 | 3/2016 | Fernandez et al. |
| 2016/0116100 A1 | 4/2016 | Thiery et al. |
| 2016/0123055 A1 | 5/2016 | Ueyama |
| 2016/0161175 A1 | 6/2016 | Benold et al. |
| 2016/0178267 A1 | 6/2016 | Hao et al. |
| 2016/0178269 A1 | 6/2016 | Hiemeyer et al. |
| 2016/0235201 A1 | 8/2016 | Soot |
| 2016/0240839 A1 | 8/2016 | Umeyama et al. |
| 2016/0258671 A1 | 9/2016 | Allard et al. |
| 2016/0290702 A1 | 10/2016 | Sexton et al. |
| 2016/0348957 A1 | 12/2016 | Hitzelberger et al. |
| 2017/0038126 A1 | 2/2017 | Lee et al. |
| 2017/0157809 A1 | 6/2017 | Deka et al. |
| 2017/0159942 A1 | 6/2017 | Ivanovic et al. |
| 2017/0176086 A1 | 6/2017 | Kang |
| 2017/0184339 A1 | 6/2017 | Liu et al. |
| 2017/0191746 A1 | 7/2017 | Seo |

FOREIGN PATENT DOCUMENTS

| | | |
|---|---|---|
| CA | 2259665 | 1/1998 |
| CA | 2640006 | 8/2007 |
| CN | 1158509 | 7/2004 |
| CN | 1970185 | 5/2007 |
| CN | 100359272 | 1/2008 |
| CN | 101437756 | 5/2009 |
| CN | 201680116 | 12/2010 |
| CN | 201748744 U | 2/2011 |
| CN | 102296714 | 5/2012 |
| CN | 102452522 | 5/2012 |
| CN | 102717578 A | 10/2012 |
| CN | 102720277 | 10/2012 |
| CN | 103072321 | 5/2013 |
| CN | 202973713 U | 6/2013 |
| CN | 203331442 | 12/2013 |
| CN | 104816478 A | 8/2015 |
| CN | 105115221 | 12/2015 |
| CN | 2014963379 U | 1/2016 |
| DE | 1150190 | 6/1963 |
| DE | 4110292 A1 | 10/1992 |
| DE | 4409091 | 9/1995 |
| DE | 19520020 | 12/1996 |
| DE | 19818890 | 11/1999 |
| DE | 19914105 | 9/2000 |
| DE | 19915311 | 10/2000 |
| DE | 19948361 | 4/2001 |
| DE | 102008026528 | 12/2009 |
| DE | 102009046810 | 5/2011 |
| DE | 102010024951 | 12/2011 |
| DE | 102011051178 A1 | 12/2012 |
| DE | 102012223536 | 6/2014 |
| DE | 102012223541 | 6/2014 |
| EP | 0260699 | 3/1988 |
| EP | 0480451 | 4/1992 |
| EP | 0645576 A1 | 3/1995 |
| EP | 0691518 | 1/1996 |
| EP | 0860669 | 8/1998 |
| EP | 1087186 | 3/2001 |
| EP | 1200785 | 5/2002 |
| EP | 1243880 | 9/2002 |
| EP | 1496322 | 1/2005 |
| EP | 1505359 | 2/2005 |
| EP | 1602425 A1 | 12/2005 |
| EP | 1624263 A2 | 8/2006 |
| EP | 1344008 | 9/2006 |
| EP | 1484563 | 10/2008 |
| EP | 1338854 | 12/2009 |
| EP | 2342511 | 8/2012 |
| EP | 2543942 A2 | 1/2013 |
| EP | 2607073 | 6/2013 |
| EP | 2789951 | 10/2014 |
| EP | 2801774 | 11/2014 |
| EP | 2878427 A1 | 6/2015 |
| FR | 2980963 | 4/2013 |
| FR | 2991698 A1 | 12/2013 |
| GB | 837929 | 6/1960 |
| GB | 1214548 | 6/1960 |
| JP | 4828353 | 8/1973 |
| JP | 51057777 | 5/1976 |
| JP | 59191588 | 12/1984 |
| JP | 131880 | 12/1989 |
| JP | 03013779 | 1/1991 |
| JP | 404165197 | 6/1992 |
| JP | 04165197 | 10/1992 |
| JP | 04309778 A | 11/1992 |
| JP | 06159922 | 6/1994 |
| JP | 7001479 | 1/1995 |
| JP | H07167377 | 7/1995 |
| JP | 8145547 | 6/1996 |
| JP | 08300052 | 11/1996 |
| JP | H08303686 | 11/1996 |
| JP | H09166271 | 6/1997 |
| JP | 10113983 | 5/1998 |
| JP | 11159693 A | 6/1999 |
| JP | 11311395 | 11/1999 |
| JP | 11336990 | 12/1999 |
| JP | 2000097390 | 4/2000 |
| JP | 2000117334 | 4/2000 |
| JP | 2000320958 A | 11/2000 |
| JP | 2001038188 | 2/2001 |
| JP | 2001116437 | 4/2001 |
| JP | 2001336691 | 12/2001 |
| JP | 2001343176 | 12/2001 |
| JP | 2002068853 | 3/2002 |

(56) References Cited

FOREIGN PATENT DOCUMENTS

| | | |
|---|---|---|
| JP | 3438948 | 8/2003 |
| JP | 03478771 | 12/2003 |
| JP | 2004303695 | 10/2004 |
| JP | 2005069596 A | 3/2005 |
| JP | 2005098637 A | 4/2005 |
| JP | 2005114015 | 4/2005 |
| JP | 2005164193 | 6/2005 |
| JP | 2005256849 | 9/2005 |
| JP | 2006077792 | 3/2006 |
| JP | 2006161834 A | 6/2006 |
| JP | 2006161945 | 6/2006 |
| JP | 03792801 | 7/2006 |
| JP | 2006200685 A | 8/2006 |
| JP | 2007263186 | 10/2007 |
| JP | 4111096 | 7/2008 |
| JP | 2008157431 | 7/2008 |
| JP | 2008190815 | 8/2008 |
| JP | 2009063064 | 3/2009 |
| JP | 2009162402 | 7/2009 |
| JP | 2009524570 | 7/2009 |
| JP | 2010017437 | 1/2010 |
| JP | 2010071565 | 4/2010 |
| JP | 2010108199 | 5/2010 |
| JP | 2010145002 | 7/2010 |
| JP | 04545126 B2 | 9/2010 |
| JP | 2010236770 | 10/2010 |
| JP | 2010276309 | 12/2010 |
| JP | 2011002033 | 1/2011 |
| JP | 2011069612 | 4/2011 |
| JP | 04779684 | 9/2011 |
| JP | 2011196644 | 10/2011 |
| JP | 2012026493 | 2/2012 |
| JP | 04897473 | 3/2012 |
| JP | 2012063029 | 3/2012 |
| JP | 2012087993 | 5/2012 |
| JP | 2012163258 | 8/2012 |
| JP | 2012189114 | 10/2012 |
| JP | 2012242075 | 12/2012 |
| JP | 2013002484 | 1/2013 |
| JP | 2013050242 | 3/2013 |
| JP | 2013050267 A | 3/2013 |
| JP | 2013076471 A | 4/2013 |
| JP | 2013088036 | 5/2013 |
| JP | 2013195009 | 9/2013 |
| KR | 20020057547 | 7/2002 |
| KR | 20020080938 | 10/2002 |
| KR | 20030083812 | 11/2003 |
| KR | 20040000126 | 1/2004 |
| KR | 20050095357 A | 9/2005 |
| KR | 100620025 B1 | 9/2006 |
| KR | 20070044024 | 4/2007 |
| KR | 1020070065743 A | 6/2007 |
| KR | 1020080103845 | 11/2008 |
| KR | 20090026045 | 3/2009 |
| KR | 1017776 | 2/2011 |
| KR | 20120007241 | 1/2012 |
| KR | 2012046621 | 5/2012 |
| KR | 2012051305 | 5/2012 |
| KR | 20150089495 A | 8/2015 |
| RU | 547614 | 5/1977 |
| RU | 2061925 C1 | 6/1996 |
| RU | 2077411 C1 | 4/1997 |
| RU | 2081858 | 6/1997 |
| RU | 2132522 C1 | 6/1999 |
| RU | 2162576 C2 | 1/2001 |
| RU | 2166158 C1 | 4/2001 |
| RU | 2187433 C2 | 8/2002 |
| RU | 2234645 C1 | 8/2004 |
| RU | 2252377 | 5/2005 |
| RU | 2253792 C2 | 6/2005 |
| RU | 2006120198 | 11/2006 |
| RU | 2349618 C2 | 3/2009 |
| RU | 2414288 C2 | 3/2011 |
| RU | 2422598 | 6/2011 |
| RU | 142892 | 7/2014 |
| RU | 2529525 C1 | 9/2014 |
| RU | 2571031 | 12/2015 |
| SU | 203707 | 12/1967 |
| SU | 00476407 A1 | 7/1975 |
| SU | 648780 A1 | 2/1979 |
| SU | 01307186 A1 | 4/1987 |
| WO | 9614207 A1 | 5/1996 |
| WO | 1996032605 | 10/1996 |
| WO | 9721767 | 6/1997 |
| WO | 1998049506 | 11/1998 |
| WO | 02060576 A1 | 4/1999 |
| WO | 9614207 A1 | 4/1999 |
| WO | 9920961 A1 | 4/1999 |
| WO | 9920964 A1 | 4/1999 |
| WO | 199920964 | 4/1999 |
| WO | 1999020964 | 4/1999 |
| WO | 0160598 A2 | 8/2001 |
| WO | 200160598 | 8/2001 |
| WO | 200202987 | 1/2002 |
| WO | 2002052208 | 4/2002 |
| WO | 02060576 A1 | 8/2002 |
| WO | 03072684 A1 | 9/2003 |
| WO | 03089729 | 10/2003 |
| WO | 2004010042 A1 | 1/2004 |
| WO | 2006045694 | 5/2006 |
| WO | 2006073540 A2 | 7/2006 |
| WO | 2006120183 | 11/2006 |
| WO | 2007033836 A1 | 3/2007 |
| WO | 2007085511 | 8/2007 |
| WO | 2007106067 A2 | 9/2007 |
| WO | 2008065453 | 6/2008 |
| WO | 2008077741 | 7/2008 |
| WO | 2008118536 A2 | 10/2008 |
| WO | 2008122483 A2 | 10/2008 |
| WO | 2009013106 A2 | 1/2009 |
| WO | 2009112433 A1 | 9/2009 |
| WO | 2009147106 | 12/2009 |
| WO | 2010007783 A1 | 1/2010 |
| WO | 2010029730 | 3/2010 |
| WO | 2010043009 | 4/2010 |
| WO | 2010092627 | 8/2010 |
| WO | 2010127947 | 11/2010 |
| WO | 2010127947 A2 | 11/2010 |
| WO | 2011003711 | 1/2011 |
| WO | 2011058678 | 5/2011 |
| WO | 2011058678 A1 | 5/2011 |
| WO | 2011081498 | 7/2011 |
| WO | 2010007783 A1 | 1/2012 |
| WO | 2012023705 | 2/2012 |
| WO | 2012026715 | 3/2012 |
| WO | 2012031885 | 3/2012 |
| WO | 2012044001 | 4/2012 |
| WO | 2012043990 | 5/2012 |
| WO | 2012085212 | 6/2012 |
| WO | 2012119892 | 9/2012 |
| WO | 2012152646 | 11/2012 |
| WO | 2013116103 | 8/2013 |
| WO | 2013116302 | 8/2013 |
| WO | 2014038150 | 3/2014 |
| WO | 2014038150 A1 | 3/2014 |
| WO | 2014095542 | 6/2014 |
| WO | 2014121893 A1 | 8/2014 |
| WO | 2014184393 | 11/2014 |
| WO | 2014184393 A1 | 11/2014 |
| WO | 2013140816 A1 | 8/2015 |
| WO | 2016082907 A1 | 6/2016 |
| WO | 2017029782 A1 | 2/2017 |

OTHER PUBLICATIONS

BASF, "Balindur™ Solutions for fixing Vaccum Insulated Panels," web page, 4 pages, date unknown, http://performance-materials.basf.us/products/view/family/balindur, at least as early as Dec. 21, 2015.

BASF, "Balindur™," web page, 2 pages, date unknown, http://product-finder.basf.com/group/corporate/product-finder/en/brand/BALINDUR, at least as early as Dec. 21, 2015.

(56) References Cited

OTHER PUBLICATIONS

PU Solutions Elastogram, "Balindur™ masters the challenge," web page, 2 pages, date unknown, http://product-finder.basf.com/group/corporate/product-finder/en/literature-document:/Brand+Balindur-Flyer--Balindur+The+new+VIP+fixation+technology-English.pdf, Dec. 21, 2014.
Cai et al., "Generation of Metal Nanoparticles by Laser Ablation of Microspheres," J. Aerosol Sci., vol. 29, No. 5/6 (1998), pp. 627-636.
Raszewski et al., "Methods for Producing Hollow Glass Microspheres," Powerpoint, cached from Google, Jul. 2009, 6 pages.

* cited by examiner

FIG. 1A
*(TRADITIONAL REFRIGERATOR CABINET CONSTRUCTION)*

FIG. 1B
*(TRADITIONAL REFRIGERATOR CABINET CONSTRUCTION)*

FIG. 1C
*(TRADITIONAL REFRIGERATOR CABINET CONSTRUCTION)*

METHOD TO CREATE VACUUM INSULATED CABINETS FOR REFRIGERATORS

CROSS-REFERENCE TO RELATED APPLICATIONS

The present application is a continuation of U.S. patent application Ser. No. 15/285,895, Now U.S. Pat. No. 9,833, 942, filed on Oct. 5, 2016, entitled "METHOD TO CREATE VACUUM INSULATED CABINETS FOR REFRIGERATORS," which is a continuation of U.S. patent application Ser. No. 14/962,587, filed on Dec. 8, 2015, entitled "METHOD TO CREATE VACUUM INSULATED CABINETS FOR REFRIGERATORS," now U.S. Pat. No. 9,463, 917, which is a continuation of U.S. patent application Ser. No. 13/833,685, filed on Mar. 15, 2013, entitled "METHOD TO CREATE VACUUM INSULATED CABINETS FOR REFRIGERATORS," now U.S. Pat. No. 9,221,210, which claims the benefit of U.S. Provisional Application Ser. No. 61/622,821, filed Apr. 11, 2012, entitled "VACUUM INSULATED CABINETS FOR HOUSEHOLD REFRIGERATORS." The entire disclosure of each application listed above is hereby incorporated by reference.

The present application is related to U.S. patent application Ser. No. 13/833,635, filed Mar. 15, 2013, entitled "A METHOD TO CREATE VACUUM INSULATED CABINETS FOR REFRIGERATORS,"; and U.S. patent application Ser. No. 13/836,669, filed Mar. 15, 2013, entitled "FOLDED VACUUM INSULATED STRUCTURE," now U.S. Pat. No. 9,140,481; and U.S. patent application Ser. No. 13/835,449, filed Mar. 15, 2013, entitled "VACUUM PANEL CABINET STRUCTURE FOR A REFRIGERATOR," now U.S. Pat. No. 8,944,541; and U.S. patent application Ser. No. 13/832,246, filed Mar. 15, 2013, entitled "DUAL COOLING SYSTEMS TO MINIMIZE OFF-CYCLE MIGRATION LOSS IN REFRIGERATORS WITH A VACUUM INSULATED STRUCTURE," now U.S. Pat. No. 9,182,158; and U.S. patent application Ser. No. 13/833, 696, filed Mar. 15, 2013, entitled "VACUUM INSULATED DOOR STRUCTURE AND METHOD FOR THE CREATION THEREOF," now U.S. Pat. No. 9,038,403; and U.S. patent application Ser. No. 13/836,143, filed Mar. 15, 2013, entitled "VACUUM INSULATED STRUCTURE TUBULAR CABINET CONSTRUCTION," now U.S. Pat. No. 9,071,907; and U.S. patent application Ser. No. 13/837,659, filed Mar. 15, 2013, entitled "METHOD OF MAKING A FOLDED VACUUM INSULATED STRUCTURE," now U.S. Pat. No. 8,986,483, all of which are incorporated herein by reference in their entirety.

FIELD OF THE INVENTION

The present invention generally relates to a vacuum insulated cabinet and the method for constructing therefore.

BACKGROUND OF THE INVENTION

Figure 1A:
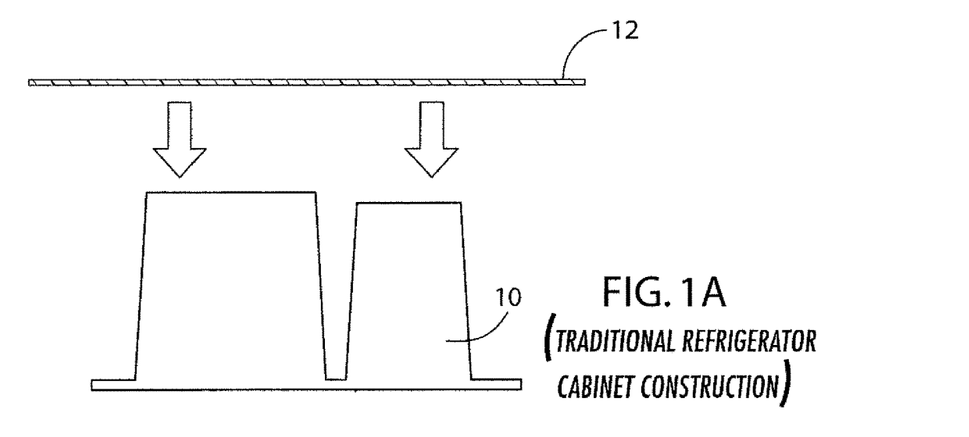
FIG. 1A is a side plan view of a prior art version of a vacuum insulated cabinet.
Figure 1B:
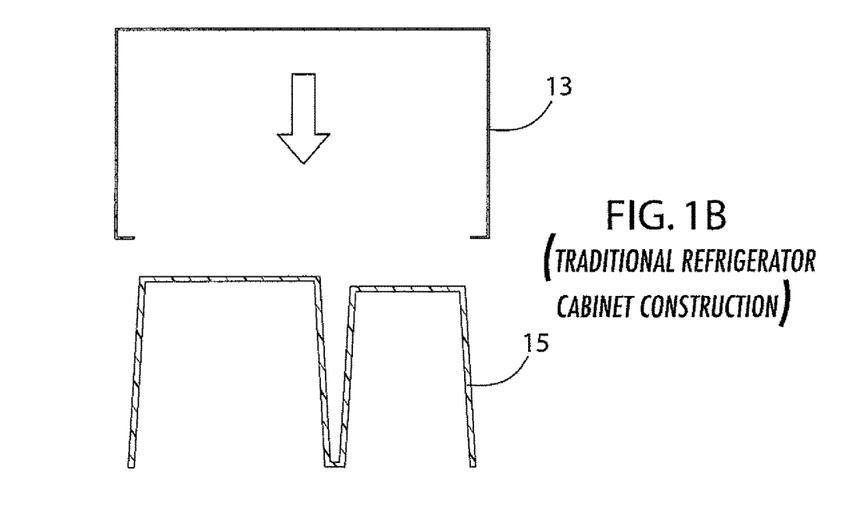
FIG. 1B is a side plan view of a prior art version of a vacuum insulated cabinet.
Figure 1C:
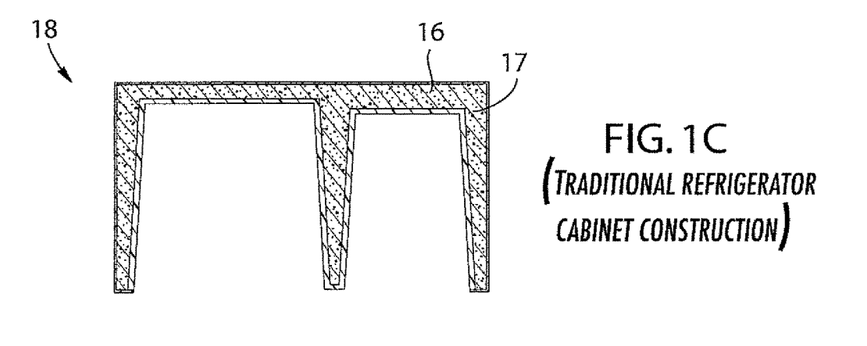
FIG. 1C is a side plan view of prior art version of a vacuum insulated refrigerator cabinet.

Known plastic liner forming processes, as shown in traditional refrigerator cabinet construction FIGS. 1A-1C, the plastic sheet does not have an impermeable layer to provide a sufficient barrier for a vacuum insulated cabinet. In current refrigerator cabinet versions an manufacturing an insulated refrigerator cabinet, as shown in FIGS. 1A-1C, a material sheet 12 having a single layer plastic is thermoformed over a first forming tool 11 to create a first intermediate structure 15. A steel sheet wrapper 13 is then fitted over the first intermediate structure 15 to create an annular space 16. The annular space 16 is filled with insulation material 14 by any conventional means. The current insulation used in the refrigerator cabinet is polyurethane foam blown into the cavity between the plastic liner and the metal wrapper.

SUMMARY OF THE INVENTION

One aspect of the present invention includes a method of forming a vacuum insulated refrigerator cabinet providing first and second sheets of material comprising at least a first layer of thermal plastic material that is at least partially permeable to nitrogen and oxygen and the second layer of material that is substantially impermeable to oxygen, nitrogen and water vapor. At least a portion of the first sheet of material is heated to a temperature at which the first sheet of material can be plastically deformed. A first forming tool is utilized to deform the first sheet of material and form a first intermediate structure having a base sidewall defining a generally quadrilateral perimeter and four first sidewalls extending transversely from the quadrilateral perimeter to define a cavity having an opening that opens in a first direction and defines a peripheral edge extending around the opening. A second forming tool is provided having sidewall portions defining four generally rectangular outwardly facing surfaces and four generally rectangular inwardly facing surfaces, and an end surface extending transversely between the inwardly and outwardly facing surfaces. The first intermediate structure is disengaged from the first forming tool followed by positioning the second forming tool into the cavity of the first intermediate structure. The base sidewalls are plastically deformed to form a second intermediate structure having a base sidewall and four inner sidewalls extending transversely from the base sidewall and defining a second cavity that opens in a second direction that is substantially opposite the first direction. The inner sidewalls are spaced apart inwardly from the first sidewalls to define an annular space that opens in the first direction. The second sheet of material is sealingly connected to the second intermediate structure around the peripheral edge to substantially close off the opening. A vacuum is formed in the annular space with an appropriate porous, thermally insulating material such as fumed silica compacted and placed in the annular space to withstand atmospheric pressure and to provide superior thermal insulation properties.

Another aspect of the present invention includes a method of forming a vacuum insulated refrigerator cabinet providing first and second sheets of material comprising at least a first layer of thermoplastic material and a second layer of material. At least a portion of the first sheet of material is heated to a temperature at which the first sheet of material can be plastically deformed. A first forming tool is utilized to deform the first sheet of material and form a first intermediate structure having the base sidewall defining a generally quadrilateral perimeter and at least one first side wall extending transversely from the quadrilateral perimeter to define a cavity having an opening that opens in a first direction and defines a peripheral edge extending around the opening. A second forming tool is provided having sidewall portions defining a plurality of generally rectangular outwardly facing surfaces and a plurality of generally rectangular inwardly facing surfaces, and an end surface extending transversely between the inwardly and outwardly facing surfaces. The first intermediate part is disengaged from the first forming tool followed by positioning the second forming tool in the cavity of the first intermediate structure. The base sidewall is plastically deformed to form a second intermediate structure having a base sidewall and a plurality of inner sidewalls extending transversely from the base sidewall and defining a second cavity that opens in a second direction that is substantially opposite the first direction. The inner sidewalls are spaced apart inwardly from the first sidewalls to define an annular space that opens in the first direction. The second sheet of material is sealingly connected to the second intermediate structure around the peripheral edge in order to substantially close off the opening. A vacuum is formed in the annular space with an appropriate porous, thermally insulating material such as fumed silica compacted and placed in the annular space to withstand atmospheric pressure and to provide superior thermal insulation properties.

Yet another aspect of the present invention includes the method for forming a vacuum insulated refrigerator cabinet providing first and second sheets of material comprising at least a first layer of thermal plastic material that is at least partially permeable to oxygen, nitrogen and water vapor, and a second layer of material that is substantially impermeable to oxygen, nitrogen and water vapor. At least a portion of the first sheet of material is heated to a temperature at which the first sheet of material can be plastically deformed. A first forming tool is utilized to deform the first sheet of material and form a first intermediate structure which defines a cavity having an opening that opens in a first direction and defines a peripheral edge extending around the opening. A second forming tool is also provided. The first intermediate part is disengaged from the first forming tool followed by positioning the second forming tool in the cavity of the first intermediate structure. A base sidewall is plastically deformed in order to form a second intermediate structure having a base sidewall and a plurality of inner sidewalls extending transversely from the base sidewall and defining a second cavity that opens in the second direction substantially opposite the first direction. The inner sidewalls are spaced apart inwardly from the first sidewalls to define an annular space that opens in the first direction. The second sheet of material is sealingly connected to the intermediate structure around the peripheral edge in order to substantially close off the opening. A vacuum is formed in the annular space with an appropriate porous, thermally insulating material such as fumed silica compacted and placed in the annular space to withstand atmospheric pressure and to provide superior thermal insulation properties.

These and other features, advantages, and objects of the present invention will be further understood and appreciated by those skilled in the art by reference to the following specification, claims, and appended drawings.

DETAILED DESCRIPTION

Before the subject invention is described further, it is to be understood that the invention is not limited to the particular embodiments of the invention described below, as variations of the particular embodiments may be made and still fall within the scope of the appended claims. It is also to be understood that the terminology employed is for the purpose of describing particular embodiments, and is not intended to be limiting. Instead, the scope of the present invention will be established by the appended claims.

Where a range of values is provided, it is understood that each intervening value, to the tenth of the unit of the lower limit unless the context clearly dictates otherwise, between the upper and lower limit of that range, and any other stated or intervening value in that stated range, is encompassed within the invention. The upper and lower limits of these smaller ranges may independently be included in the smaller ranges, and are also encompassed within the invention, subject to any specifically excluded limit in the stated range. Where the stated range includes one or both of the limits, ranges excluding either or both of those included limits are also included in the invention.

In this specification and the appended claims, the singular forms "a," "an" and "the" include plural reference unless the context clearly dictates otherwise.

Figure 2A:
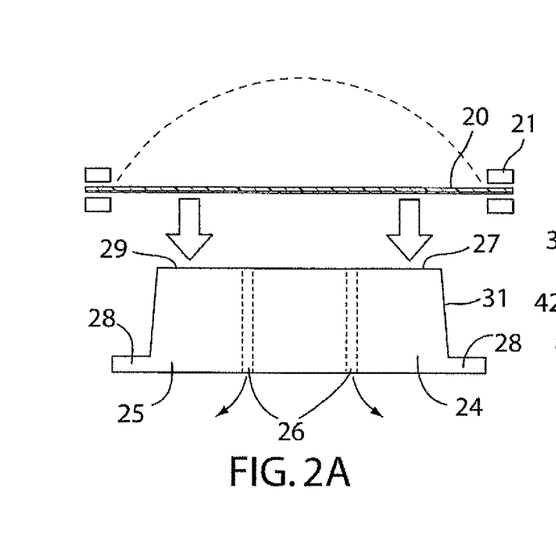
FIG. 2A is a side plan view of a method according to the present invention.

FIGS. 2A-2F show a method of forming a vacuum insulated cabinet 10 according to the present invention. FIG. 2A shows a first forming tool 24 having a generally quadrilateral perimeter formed from a base wall 29 and a plurality of sidewalls 31 with a flange 28 extending from a bottom portion 25 of the quadrilateral perimeter. The first forming tool 24 may further include at least one vacuum channel 26. FIG. 2A also shows a first material sheet 20. The first material sheet 20 is typically comprised of a first layer of thermoplastic material that is partially permeable to oxygen, nitrogen and water vapor and a second layer of material that is substantially impermeable to oxygen, nitrogen and water vapor. A typical plastic composite used in this process is a first layer of high impact polystyrene (HIPS) food grade, specially tailored for refrigeration products and a second impermeable layer of EVOH. One exemplary embodiment uses Polystyrol 2710 by BASF and Edistr RR740E by Polimeri Europa as the first layer.

The first material sheet 20 is first softened typically using heat until the first material sheet 20 reaches a temperature at which the first material sheet 20 can be plastically deformed. Typically, the first material sheet 20 is deformed into a semi-circle like shape typically formed by blowing air centrally on the first material sheet 20 while the first material sheet 20 has its edges clamped down by clamp 21 to hold the edges in place, as shown in the dashed lines in FIG. 2A. The first material sheet 20 is then lowered onto a top perimeter 27 of the first forming tool 24. The edges of the first material sheet 20 are configured to be clamped onto the flanges 28 of the first forming tool 24. The flanges 28 are typically comprised of the sidewalls 31 of the first forming tool 24. A vacuum is then used to thermoform the first material sheet 20 over the first forming tool 24 to form the first intermediate structure 30 (shown in FIG. 2B).

Figure 2B:
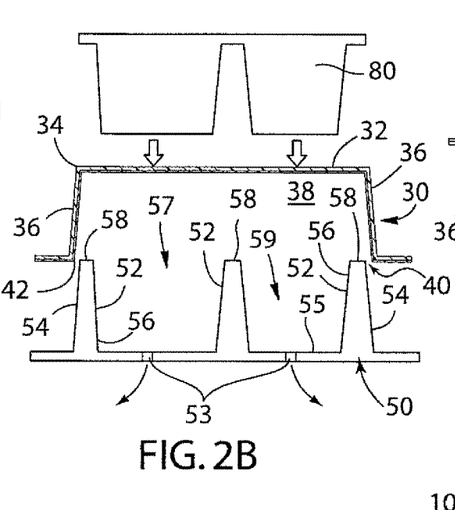
FIG. 2B is a side plan view of the method of the present invention.

Next, as shown in FIG. 2B, the first intermediate structure 30 is aligned over a second forming mold 50. As also shown in FIG. 2B, the first intermediate structure 30 has a base sidewall 32 defining a generally quadrilateral perimeter 34 and a plurality of first sidewalls 36, typically four sidewalls, extending transversely from the quadrilateral perimeter 34 in order to define a cavity 38 which has an opening 40 that opens in a first direction and defines a peripheral edge 42 extending around the opening 40. The opening 40 of the cavity 38 of the first intermediate structure 30 is aligned with a second forming tool 50. The second forming tool 50 is typically comprised of a base sidewall 55 and sidewall portions 52 which define a plurality of generally rectangular outwardly facing surfaces 54 and a plurality of generally rectangular inwardly facing surfaces 56, and at least one end surface 58 extending transversely between the inwardly 56 and outwardly 54 facing surfaces. The second forming tool 50 includes vacuum holes 53 to help form the first intermediate structure 30 onto the second forming tool 50 in order to produce a second intermediate structure 60 (FIG. 2C).

As shown in FIG. 2B, the first intermediate structure 30 is heated to a temperature at which it can plastically deform. The first intermediate structure 30 is then formed over the second forming mold 50 using vacuum holes 53 to help form the second intermediate structure 60. Optionally, a third forming tool 80 may be utilized. The third forming tool 80 is configured to engage the second forming tool 50 in order to help form the second intermediate structure 60. The third forming tool 80 is typically an opposite version of the second forming tool 50. For example, if the second forming tool 50 is a female mold, the third forming tool 80 is a corresponding male mold, and vice versa.

Figure 2C:
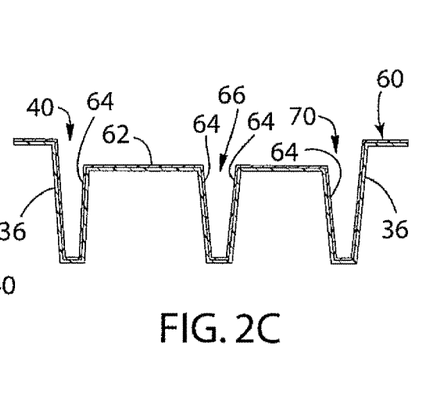
FIG. 2C is a side plan view of the method of the present invention.
Figure 2D:
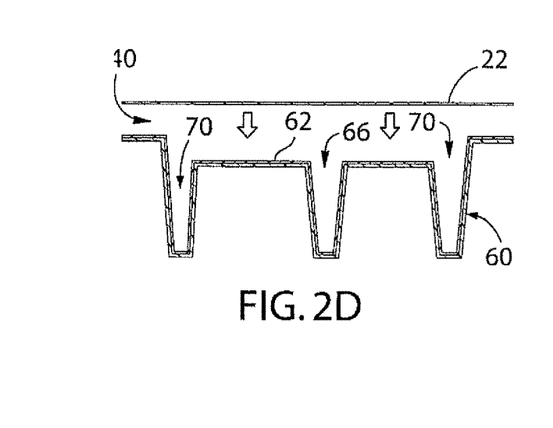
FIG. 2D is a side plan view of the method of the present invention.
Figure 2E:
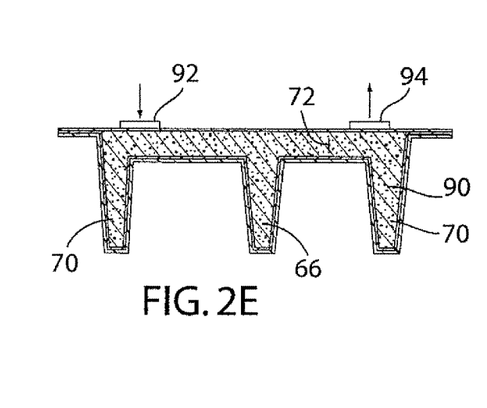
FIG. 2E is a side plan view of the method of the present invention.
Figure 2F:
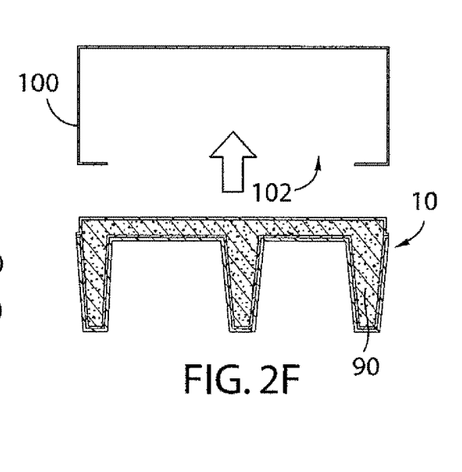
FIG. 2F is a side plan view of the method of the present invention.

FIG. 2C shows the second intermediate structure 60. The second intermediate structure 60 typically includes a base sidewall 62 and a plurality of inner sidewalls 64 extending transversely from the base sidewall 62 and defining a second cavity 66 that opens in a second direction that is substantially opposite the first direction. The inner sidewalls 64 are spaced apart inwardly from the first sidewalls 36 to define an annular space 70 that opens in the first direction. Next, a second material sheet 22 (FIG. 2D) is sealingly connected to the second intermediate structure 60. The second material sheet 22 is extended across the peripheral edge of the second intermediate structure 60 in order to substantially close off the opening 40 of the second intermediate structure 60 and form an annular space 70. As shown in FIG. 2E, the porous insulation material 90 is typically inserted and compacted to a density to withstand atmospheric pressure into the annular space 70 through at least one opening hole 92 typically located on the second material sheet 22. Additionally, the second material sheet 22 may have additional holes 94 in order to let air exit out of the annular space 70. Alternatively, pre-formed and compacted insulation material 90 may be inserted into the annular space 70 of the second intermediate structure 60 prior to the sealing of the second material sheet 22. Once the insulation material 90 is inserted and the second material sheet 22 is sealingly connected to the second intermediate structure 60, a vacuum is used, typically in holes 92 and 94, in order to form a vacuum within the annular space 70 and sealed to produce a vacuum insulated cabinet 10 (FIG. 2F). Moreover, as shown in FIG. 2F, a sheet wrapper 100 may optionally be disposed over the vacuum insulated structure 10 in order to provide additional structural support. The sheet wrapper 100 is typically comprised of steel and is generally quadrilateral in shape having an opening 102 on one side configured to receive the vacuum insulated cabinet 10.

Figure 3A:
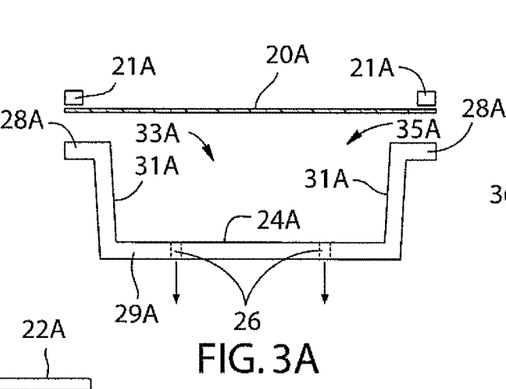
FIG. 3A is a side plan view of another embodiment of the present invention.
Figure 3B:
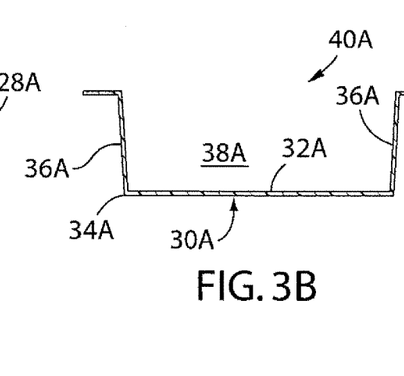
FIG. 3B is a side plan view of the method of the present invention shown in FIG. 3.
Figure 3C:
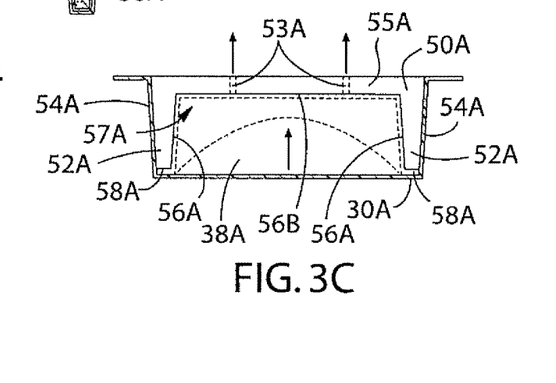
FIG. 3C is a side plan view of the method of the present invention shown in FIG. 3.

FIGS. 3A-3D show an alternate embodiment of the present invention. FIG. 3A shows a first forming tool 24A having a base sidewall 29A defining a generally quadrilateral perimeter and a plurality of sidewalls 31A extending transversely from the quadrilateral perimeter in order to define a cavity 33A having an opening 35A that opens in a second direction. As shown in FIGS. 2A and 3A, the first forming tool may be a male type mold structure 24 or a female type mold structure 24A. A first material sheet 20 (FIG. 3A) is plastically deformed through heating the first material sheet 20A which allows the first material sheet 20A to form a first intermediate structure 30A utilizing the first forming tool 24A. Edges of the first material sheet 20A are clamped to flanges 28A or transversely extending sidewalls 31A by clamp 21A in order to form the first intermediate structure 30A. Once the first intermediate structure 30A is formed, it typically comprises a base sidewall 32A defining a generally quadrilateral perimeter 34A and a plurality of sidewalls 36A extending transversely from the quadrilateral perimeter 34A in order to define a cavity 38A having an opening 40A that opens in the second direction.

Figure 3D:
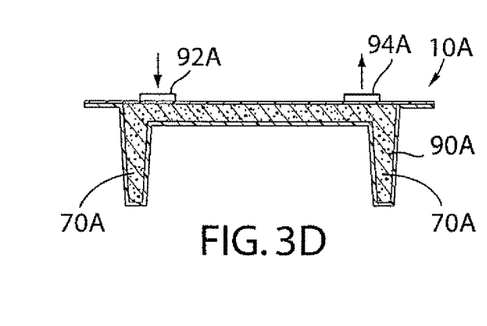
FIG. 3D is a side plan view of the method of the present invention shown in FIG. 3.
Figure 4:
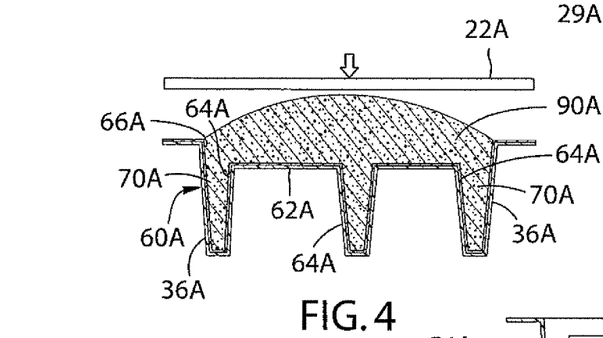
FIG. 4 is a side plan view of yet another embodiment of the method of the present invention.

Next, a second forming tool 50A (FIG. 3C) is disposed inside of the cavity 38A of the first intermediate structure 30A. The second forming tool 50A typically has sidewall portions 52A defining a plurality of generally rectangular outwardly facing surfaces 54A and inwardly facing surfaces 56A and at least one end surface 58A extending transversely between the inwardly facing surfaces 56A and outwardly facing surfaces 54A. Moreover, the second forming tool 50A includes a cavity 57A defined by surface 56B of the at least one base sidewall 55A and the inwardly facing surfaces 56A that opens in the first direction. Once the second forming tool 50A is engaged with the first intermediate structure 30A, the first intermediate structure 30A is plastically deformed using a vacuum system to produce a second intermediate structure 60A (FIG. 4). The second intermediate structure 60A typically has a base wall 62A and inner sidewalls 64A extending transversely from the base wall 62A defining a second cavity 66A that opens in the first direction. The inner sidewalls 64A are spaced apart inwardly from the first sidewalls 36A in order to define an annular space 70A. In the embodiment shown in FIGS. 3A-3D, the second forming tool 50A is comprised of pre-formed and compacted highly porous insulation material 90A. The insulation material 90A is configured to be solid enough to withstand atmospheric pressure when evacuated and to allow the first intermediate structure 30A to be formed over the insulation material 90A to produce the second intermediate structure 60A. In the embodiment shown in FIG. 3C, the second forming tool 50A remains within the annular space 70A, and is sealed inside by the second material sheet 22A. The second material sheet 22A is sealingly connected to the second intermediate structure 60A around an edge of the base sidewall 62A of the second intermediate structure 60A. As shown in FIG. 3D, air can then be evacuated from the structures shown in FIG. 3C via holes 92A, 94A in order to produce a vacuum insulated cabinet 10A.

As shown in FIG. 4, the insulation material 90A may be inserted into the second intermediate structure prior to the covering of the structure 60A with the second material sheet 22A. The insulation material 90A may be inserted in such a way that it forms a semi-circle shape rising above the cavity 66a in the second intermediate structure 60A. The second material sheet 22A is configured to compact the insulation material 90A to a desired compaction level during the sealing process. The addition and compaction steps can be repeated as desired to reach the desired compaction level of the insulation material 90A to withstand atmospheric pressure when the annular cavity is which contains material 90A is evacuated. The insulation material 90A is typically a highly porous granular insulation such as fumed silica or an open cell polyurethane foam or may be any other insulation material 90A known to one of ordinary skill in the art. Any ambient air is then evacuated from the annular space 70A forming a vacuum insulated cabinet 10A. The processes described above result in less thinning of the first 20A and second 22A material sheets in order to ensure that the first material sheet 20A and the second material sheet 22A remain intact in order to provide a vacuum insulated structure.

The invention claimed is:

1. A method of forming a vacuum insulated refrigerator structure, the method comprising:
   providing a sheet of material comprising at least a first layer of thermoplastic material that is at least partially permeable to oxygen, nitrogen and water vapor, and a second layer of material that is substantially impermeable to oxygen, nitrogen and water vapor;
   heating at least a portion of the first sheet of material to a temperature at which the first sheet of material can be plastically deformed;
   applying a first force to the first sheet of material to form four first sidewalls extending transversely from a central portion of the first sheet of material;
   applying a second force to the first sheet to form a base sidewall and four inner sidewalls extending transversely from the base sidewall in the first direction, and a transverse end wall interconnecting the first sidewalls and the inner sidewalls to define an annular space that opens in the first direction, and wherein the base sidewall and the inner sidewalls define a refrigerator cavity that opens in a second direction that is substantially opposite the first direction;
   closing off the annular space;
   filling the annular space with porous material; and
   forming a vacuum in the annular space containing the porous material.

2. The method of claim 1, wherein:
   the sheet of material comprises a first sheet of material; and
   closing off the annular space includes securing a second sheet of material to the first sheet of material.

3. The method of claim 2, wherein:
   the second sheet of material is spaced apart from the base sidewall to form a central space that is connected to the annular space.

4. The method of claim 1, wherein:
   the first force is applied in the first direction, and:
   the second force is applied in the second direction.

5. The method of claim 1, including:
   utilizing a first tool to apply the first force; and
   utilizing a second tool to apply the second force.

6. The method of claim 5, wherein:
   the first tool is utilized to form a first intermediate structure having a cavity defined by the first sidewalls and a base sidewall.

7. The method of claim 6, wherein:
   the second forming tool includes sidewall portions defining outwardly facing surfaces, inwardly facing surfaces, and an end surface extending between the inwardly and outwardly facing surfaces; and including:
   disengaging the first intermediate structure from the first forming tool, followed by positioning the second forming tool in the cavity of the first intermediate structure.

8. The method of claim 6, wherein:
   the second forming tool comprises compacted porous insulation material; and
   at least a portion of the second forming tool is disposed in the cavity while a vacuum is formed in the space.

9. The method of claim 5, wherein;
   the base sidewall has a quadrilateral perimeter; and including:
   forming the four inner sidewalls to extend transversely from the base sidewall.

10. A method of forming a vacuum insulated refrigerator structure, the method comprising:
    providing a sheet of material comprising at least a first layer of thermoplastic material that is at least partially permeable to oxygen, nitrogen and water vapor, and a second layer of material that is substantially impermeable to oxygen, nitrogen and water vapor;
    heating at least a portion of the sheet of material to a temperature at which the sheet of material can be plastically deformed;
    deforming the sheet of material and form a first intermediate structure having a base sidewall and a first sidewall extending transversely from the base sidewall to define a cavity having an opening that opens in a first direction and defines a peripheral edge extending around the opening;
    plastically deforming the base sidewall utilizing a second forming tool to form a second intermediate structure having a base sidewall and an inner sidewall extending transversely from the base sidewall, wherein the inner sidewall is spaced apart inwardly from the first sidewall to define a space;
    at least partially filling the space with a porous material;
    closing off the opening; and
    forming a vacuum in the space containing the porous material.

11. The method of claim 10, wherein:
    the sheet of material comprises a first sheet of material; and
    closing off the opening includes sealingly connecting a second sheet of material to the second intermediate structure around the peripheral edge.

12. The method of claim 10, wherein:
    a first forming tool is utilized to deform the sheet of material and form a first intermediate structure.

13. The method of claim 12, wherein:
    a second firming tool is utilized to form the second intermediate structure.

14. The method of claim 13, wherein:
    the second forming tool includes sidewall portions defining a plurality of outwardly facing surfaces and a plurality of inwardly facing surfaces, and at least one end surface extending between the inwardly and outwardly facing surfaces; and including:
    disengaging the first intermediate structure from the first forming tool, followed by positioning the second forming tool in the cavity of the first intermediate structure.

15. The method of claim 11, wherein:

the space defined by the first sidewall and the inner sidewall comprises an annular space;

the second sheet of material is spaced apart from the base sidewall of the second intermediate structure to form a central space that is connected to the annular space.

16. A method of forming a vacuum insulated refrigerator structure, the method comprising:

providing a sheet of material;

heating and plastically deforming the sheet of material to form a first intermediate structure having a base sidewall and a first sidewall extending transversely from the base sidewall to define a cavity having an opening, the first sidewall defining a peripheral edge extending around the opening;

plastically deforming the first intermediate structure to form a second intermediate structure having a base sidewall and an inner sidewall extending transversely from the base sidewall, wherein the inner sidewall is spaced apart from the first sidewall to define a space;

closing off the opening;

filling the space with a porous material; and forming a vacuum in the space.

17. The method of claim 16, wherein:

the sheet of material comprises a first sheet of material; and closing off the opening includes sealingly connecting a second sheet of material to the second intermediate structure around the peripheral edge.

18. The method of claim 17, wherein:

the first and second sheets of material comprise a thermoplastic material and an impermeable material that is substantially impermeable to oxygen, nitrogen and water vapor; and including:

heating at least a portion of the first sheet of material to a temperature at which the first sheet of material can be plastically deformed.

19. The method of claim 16, including:

Utilizing a first forming tool to deform the first sheet of material to form the first intermediate structure;

providing a second forming tool having sidewall portions defining a plurality of outwardly facing surfaces and a plurality of inwardly facing surfaces, and at least one end surface extending transversely between the inwardly and outwardly facing surfaces;

disengaging the first intermediate structure from the first forming tool, followed by positioning the second forming tool in the cavity of the first intermediate structure.

20. The method of claim 16, including:

plastically deforming the first intermediate structure to form an end wall extending transversely between the first sidewall and the inner sidewall.

\* \* \* \* \*